(12) United States Patent
Pringle et al.

(10) Patent No.: US 9,657,177 B1
(45) Date of Patent: May 23, 2017

(54) UVC REFLECTIVE COATING

(71) Applicant: Lumacept, Inc., Grand Forks, ND (US)

(72) Inventors: Todd Andrew Pringle, Reiles Acres, ND (US); Brian Myron Tande, Grand Forks, ND (US)

(73) Assignee: Lumacept, Inc., Grand Rapids, ND (US)

( * ) Notice: Subject to any disclaimer, the term of this patent is extended or adjusted under 35 U.S.C. 154(b) by 637 days.

(21) Appl. No.: 14/071,889

(22) Filed: Nov. 5, 2013

Related U.S. Application Data

(60) Provisional application No. 61/722,238, filed on Nov. 5, 2012.

(51) Int. Cl.
*F21V 9/04* (2006.01)
*C09D 5/33* (2006.01)

(52) U.S. Cl.
CPC .................................. *C09D 5/004* (2013.01)

(58) Field of Classification Search
USPC ........................... 361/142; 428/172; 252/588
See application file for complete search history.

(56) References Cited

U.S. PATENT DOCUMENTS

| | | | |
|---|---|---|---|
| 3,300,325 A * | 1/1967 | Lindquist | C09D 5/30 106/163.01 |
| 3,956,201 A | 5/1976 | Seiner | |
| 5,246,687 A | 9/1993 | Gorre et al. | |
| 5,506,031 A * | 4/1996 | Spain | B29C 37/0025 428/142 |
| 5,892,621 A | 4/1999 | McGregor et al. | |
| 6,154,311 A | 11/2000 | Simmons, Jr. et al. | |
| 6,656,621 B2 | 12/2003 | Okazaki et al. | |
| 6,911,177 B2 | 6/2005 | Dea | |
| 7,511,281 B2 | 3/2009 | Cooper | |
| 7,754,339 B2 | 7/2010 | Abelli et al. | |
| 2003/0059549 A1 | 3/2003 | Morrow et al. | |
| 2011/0180768 A1 * | 7/2011 | Curry | F41H 3/02 252/587 |
| 2013/0294002 A1 * | 11/2013 | Thompson | H05F 3/00 361/212 |

* cited by examiner

*Primary Examiner* — Monique Peets
(74) *Attorney, Agent, or Firm* — Schwegman Lundberg & Woessner, P.A.

(57) ABSTRACT

The present disclosure provides an ultraviolet light-C (UVC) reflective coating composition. The UVC reflective coating includes a polymer binder of a first volume having a first refractive index and an inorganic material of a second volume having a second refractive index at least 0.2 greater than the first refractive index, the second volume in ratio to the first volume such that the reflective coating is at or below critical pigment volume concentration (CVPC) (CPVC), wherein the reflective coating is configured to diffusely reflect at least 10% UVC.

19 Claims, No Drawings

UVC REFLECTIVE COATING

CLAIM OF PRIORITY

This patent document claims the benefit of priority of Pringle, U.S. Provisional Patent Application Ser. No. 61/722,238, entitled "COMPOSITIONS OF UVC REFLECTING COATINGS," filed on Nov. 5, 2012, which is herein incorporated by reference in its entirety.

TECHNICAL FIELD

The present disclosure relates generally to compositions of coatings which reflect ultraviolet light, including ultraviolet-C (UVC), more particularly, UVC reflecting polymer-binder coating compositions which are below the critical pigment volume concentration (CPVC).

BACKGROUND

Reflective surfaces can include metals, plastics, and the like. Non-reflective surfaces can be coated with a light reflective coating so as to effectively make the surface light reflective. Light reflective coatings, such as paint, can be used for a number of different applications. For example, a light reflective coating can be used to provide aesthetic benefits or energy saving benefits. Specific types of light reflective coatings, such as a UVC reflective coating can be used to increase the effectiveness of UVC-emitting light sources for several applications, including, but not limited to, disinfecting surfaces or rooms (e.g., a hospital room or a clean room), decontaminating wastewater, catalyzing a desired chemical reaction, oxidizing a volatile organic compound, or the like.

U.S. Pat. No. 3,956,201 and U.S. Pat. No. 5,892,621 teach fluorinated polymers and air void morphologies to scatter a broad spectrum of light.

U.S. Pat. No. 7,511,281 teaches an Ultraviolet Germicidal Irradiation (UVGI) sterilization process.

U.S. Pat. No. 3,300,325 teaches air-void filled coating compositions for UVA and UVB reflecting paint.

SUMMARY OF THE INVENTION

The present inventors have recognized, among other things, that a problem to be solved can include providing a coating capable of reflecting UVC at about 254 nanometers. Metals, plastics, or paints can be UVC-absorbing. Current coatings configured to reflect ultraviolet light typically scatter UVA or UVB light but absorb UVC. In an example, the present subject matter can provide a solution to this problem, such as by a coating composition configured to diffusely reflect at least 10% UVC at about 254 nanometers (nm).

The inventors have determined, amongst other things, that a problem to be solved includes providing a coating, including a pigment, configured to reflect (e.g., not absorb) UVC light. Common previous approaches typically used titanium dioxide, which can be UVC absorbing. For example, interior paints typically utilize titanium dioxide as the primary light scattering pigment and as such, absorb approximately 93% to 97% percent of the UVC light and typically reflect 3% to 7% of the UVC light. In an example, the present subject matter can provide a solution to this problem, such as by providing a coating including an inorganic material configured to reflect UVC light, such as at least about 10% of incident UVC light.

The present inventors have recognized, among other things, that a problem to be solved can include providing a UVC reflective coating capable of being used in a harsh environment. Harsh environments can include, for example, a hospital or wastewater or air disinfection reactor, wherein coatings can be subjected to staining, abrasion, damaging chemicals, or water. In an example, the present subject matter can provide a solution to this problem, such as by providing a coating at or below critical pigment volume concentration, such that the present UVC reflective coating can be less susceptible to such harsh conditions. That is, the present coating, in an example, is not a void coating.

DETAILED DESCRIPTION

Reference will now be made in detail to certain claims of the invention, examples of which are illustrated in the accompanying drawings. While the invention will be described in conjunction with the enumerated claims, it will be understood that they are not intended to limit those claims. On the contrary, the invention is intended to cover all alternatives, modifications, and equivalents, which can be included within the scope of the invention as defined by the claims.

References in the specification to "one embodiment," "an embodiment," "an example embodiment," and the like, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The term "about" as used herein can allow for a degree of variability in a value or range, for example, within 10%, within 5%, or within 1% of a stated value or of a stated limit of a range. When a range or a list of sequential values is given, unless otherwise specified any value within the range or any value between the given sequential values is also disclosed.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "multiple" refers to two or more (e.g., 2, 3, 4, 5, 6, etc.).

The term "binder" refers to any material or substance that holds or draws other materials together to form a cohesive whole.

The term "pigment" refers to a substance that imparts opacity, coloring or aesthetic appearance to the coating. Generally, a coloring pigment is a material that changes the color of reflected or transmitted light as the result of wavelength-selective absorption. This physical process differs from fluorescence, phosphorescence, and other forms of luminescence, in which a material emits light. That is, coloring pigments appear to be colored because they absorb some wavelengths of light more than others. One or pigments can be employed in the manufacture of the coating described herein, such that the thin coating has a desired color. Suitable colors include, for example, black, yellow, blue, green, pink, red, orange, violet, indigo, brown, and any combination therein. Generally, an opacifying pigment, which imparts whiteness, is a material that imparts opacity in a coating by light scattering due to index of refraction differences between the opacifying pigment and another material in the coating, such as a binder or air voids.

The term "UVGI" refers to Ultraviolet Germicidal Irradiation, such as a common process used to control the spread of dangerous microbes.

The term "ultraviolet light" refers to electromagnetic radiation with a wavelength shorter than human-visible light, such as about 10 nm to about 400 nm.

The term "UVC" (e.g., ultraviolet C, short-wave ultraviolet, FAR-UV, deep UV) refers to the band of UV light between about 100 nm and about 280 nm. Further, a subset of UVC includes, UV light lying between the wavelengths of about 200 and about 300 nm, commonly referred to as the "germicidal region" because UV light in this region can be lethal to microorganisms including, but not limited to, bacteria, protozoa, viruses, molds, yeasts, fungi, nematode eggs, or algae. An especially destructive wavelength of UV light is about 260 nm. Germicidal UV lamps typically emit light with a wavelength that is substantially close to 260 nm for its destructive purposes, such as around typically around 254 nm.

The term "absorbing" refers to the process by which a photon is prevented from transmitting through, refracting, or reflecting from a material.

The term "PVC" refers to Pigment Volume Concentration, or the total volume percentage of pigment in a coating system after it has dried, cured or otherwise been applied such that diluents or solvents have evaporated, and intended physical or chemical changes have occurred.

The term "CPVC" refers to Critical Pigment Volume Concentration, or the point at which there is sufficient binder present to at least partially cover each pigment particle and fill most voids between particles.

As used herein, "greater than CPVC" refers to pigment concentrations where the pigments become difficult to fully wet so as to be encapsulated by the binder. That is, pigment particles can be touching so as to provide a system with air voids, poor stain resistance, poor rub resistance, low gloss, or reduced material properties.

The term "less than CPVC" refers to pigment concentrations where the pigment particles remain at least partially to substantially fully wetted or encapsulated by the binder. That is, the binder is able to fill most voids between pigment particles.

The term "void coating" refers to a greater than CPVC coating where opacity is achieved by the index of refraction difference imparted by air voids.

The term "non-void coating" refers to a less than CPVC coating where large scale air-voids are not present.

The term "human-visible" refers to optical properties of an object or process that occurs within the range of human vision, typically from about 400 to about 700 nanometers in wavelength.

The term "transparent" refers to a photon traveling through a material without being absorbed.

The term "light" refers to any form of electromagnetic radiation.

The term "specular reflection" refers to mirror-like reflection of light from a surface, in which light from a single incoming direction is reflected into a single outgoing direction.

The term "light scattering", "diffusively reflect", or "diffuse reflection" refers to reflection of light from a surface or sub-surface such that an incident ray is reflected or scattered at many angles rather than at just one angle as in the case of specular reflection.

The term "oxide" refers to binary compound of oxygen and an element, including a single oxide, a dioxide, and a trioxide. For example, a metal oxide can include the metal with a single oxygen atom, two oxygen atoms, or three oxygen atoms.

The term "coating" refers to a layer or film applied to a substrate.

The term "particle size" refers to an average particle diameter.

The present disclosure describes a UVC reflective coating including a polymer binder of a first volume having a first refractive index and an inorganic material of a second volume having a second refractive index at least 0.2 greater than the first refractive index, the second volume in ratio to the first volume such that the reflective coating is at or below critical pigment volume concentration (CPVC), wherein the reflective coating is configured to diffusely reflect at least 10% UVC at about 254 nanometers (nm).

Polymer Binder

Binders can include synthetic or natural resins such as alkyds, acrylics, vinyl-acrylics, vinyl acetate/ethylene (VAE), polyurethanes, polyesters, melamine resins, epoxy, or oils. Binders can be categorized according to the mechanisms for drying or curing. Drying may refer to evaporation of the solvent or thinner, but it often refers to oxidative cross-linking of the binders and is indistinguishable from curing. Some coverings, such as paints, form by solvent evaporation only, but many rely on cross-linking processes.

The inventors have determined that many polymer backbone chemistries used for transparent and opaque coatings, such as many polyurethane-based compositions, can contain UVC absorbing molecular structures. For example, acrylic chemistries are generally considered to be UV transparent, but in the UVC wavelengths acrylic chemistries can become partially UVC absorbing, especially towards 254 nm. To mitigate inherent UVC absorption in a binder, the coating can be formulated to film-form as a thin layer. According to the present disclosure, preferred binder chemistries can at least partially avoid carbon to carbon conjugations such as nitroethene, acyclic diene, heteroannular diene, homoannular diene, enimine, and triene as they can contain UVC absorbance bands between 215 to 260 nm; aromatics, such as benzene, as it can have an absorbance band at 256 nm, and carboxyl, phenol, and naphthalene aromatex can have a UVC absorbance band from 220 to 280 nm; or other organic compound bond structures with UVC absorption.

In an example a polymer binder can include an organic binder. Polymer binders can include aliphatic compounds, including alkanes, alkenes, or alkynes. In an example, the polymer binder can include a monomer with a small pendant group or pendant atom with bond dissociation energies, including, but not limited to, of carbon to fluorine bonds at about 450 kJ/mole or carbon to hydrogen bonds at about 410 kJ/mole. For example, monomers with 1, 2, 3, or all 4 pendant groups around the sigma bond of non-chlorine halogenated elements possess strong relatively un-reactive bonds suitable for polymers to be used as binders for the UVC reflecting coatings. For example, the polymer binder can include monomers with halogenated elements. The polymer binder can include at least one fluorinated long chain addition polymer comprised of at least one monomer having at least one fluorine atom attached to a carbon chain form. In an example, the polymer binder includes polyvinylidene fluoride.

In another example, the polymer binder can include a monomer with acetate or acrylic and other common pendant groups in at least partial or full replacement of hydrogen or halogen pendant atoms or groups. The addition of pendant groups with oxygen bonds including carbonyls, hydroxyls, and carboxyls can have the effect of introducing some UVC absorption but in some embodiment it can be preferred over monomers with halogen pendant groups because of improved adhesion, cost benefits, or the like.

In another example, the polymer binder can include polymers made from a blend of monomers. The blended polymer binder can include both organic and inorganic polymers. An example of an inorganic polymer includes polydimethylsiloxane. In another example, the polymer binder can include substantially all inorganic polymers, including examples where no organic monomer is present in the polymer binder.

The polymer binder can include polymers made from more than one monomer. The polymer binder can include more than one polymer blend. The binder can include more than one binder type including organic and inorganic binders.

Using the teaching describe herein, one skilled in the art can make coatings with polymer binders that can include, but are not limited to, alkyds, acrylics, vinyl-acrylics, vinyl acetate/ethylene (VAE), polyurethanes, melamine resins, epoxies and some oil resins. It should be noted that many of the polymer binder examples listed above can become unsuitable if they are modified with aromatic groups, which is a common copolymer structure of many of the binders both within the chain structure and as a pendant group.

Viscoelastic properties of the binder can be selected based on a desired application, such as a substrate material the UVC reflective coating is to be applied. For example, a more flexible polymer binder can include glass transition temperatures (Tg) lower than about 20 degrees Celsius (° C.) or lower can be selected for fabrics, while a polymer binder with Tg higher than about 25° C. or higher can be selected for rigid surfaces, such as a floor, a wall, a ceiling, or the like. The minimal film formation temperature (MFFT) of the formulated coating can be lower than the application temperature.

Inorganic Material

Inorganic materials can include what are generally referred to as pigments. Inorganic materials and pigments can include granular solids incorporated in the coating to contribute opacity or color. Inorganic materials (e.g., pigments) that may be suitable for UVA reflecting compositions can be absorbing at UVC. Examples of pigments known for at least partial UVA reflection include zinc-containing inorganics and antimony trioxide, both of which at least partially absorb UVC. Further, fewer inorganics are suitable pigments for UVC reflecting less-than-CPVC (e.g., non-void) coatings. Preferred inorganics include sub-micron inorganics which are at least partially transparent at UVC wavelengths. Further, preferred inorganics include those which also have an index of refraction which is different from than that of the binder by at least about 0.2. In an example, the inorganic material can have an index of refraction at least about 0.3, 0.4, 0.5, 0.7, 1.0, 1.2, 1.4, 1.6, 1.8, 2.0, 2.2, 2.4 or greater. In an example, the inorganic material and the binder can have an index of reflection difference of at least about 0.3, 0.4, 0.5, 0.7, 1.0, 1.2, 1.4, 1.6 or greater.

In an example, the inorganic material can have nearly homogenous crystal structures. For example, the inorganic material can a have purity level such that at least about 90 wt %, 91 wt %, 92 wt %, 93 wt %, 94 wt %, 95 wt %, 96 wt %, 97 wt %, 98 wt % or 99 wt % or greater of the inorganic constitutes UVC transparent crystals, and most preferably at least about 99.9 wt %. In an example, the inorganic material can be substantially devoid of an impurity, such as titanium dioxide, zinc, lead, or UVC absorbing materials. Substantially devoid can include something that is less than about 1 wt %, 0.5 wt % 0.2 wt %, 0.1 wt %, 0.01 wt % or less of a total weight of the coating.

Those skilled in the art can identify those inorganic materials that meet the preferences described herein. Particles of the inorganic material smaller than about 200 nm or less can be used when formulating semi-transparent (e.g., human-visible wavelengths) compositions. Inorganic materials can include, in an example, an average particle size of about 10 nm to about 500 nm. The refraction index of the inorganic material relative to the binder can also affect optimal particle sizing for both human-visible transparent and opaque UVC reflective coatings.

In an example, the inorganic material can include a pure form, an oxide form, a nitride form or an oxynitride form, of at least one of the group consisting of magnesium, aluminum, tantalum, titanium, holmium, calcium, lanthanum, germanium, tellurium, europium, erbium, neodymium, samarium, ytterbium, gold, silver, and zirconium. In an example, the inorganic material can include any of the group consisting of magnesium oxide, aluminum oxide, tantalum oxide, titanium oxide, holmium oxide, hafnium oxide, calcium oxide, lanthanum oxide, germanium oxide, tellurium oxide, zirconium oxide, europium oxide, erbium oxide, neodymium oxide, samarium oxide, ytterbium oxide, gold oxide, and silver oxide.

Refractive Index

The present inventors have determined that common refractive index values for coating materials are not accurate for UVC reflective application unless those refractive index values are measured at the UVC wavelengths. However, refractive index differences between phases and particles can be experimentally determined.

That is binders, additives, and pigments, such as the inorganic material, can be separately studied for their UVC absorbance, reflectance, fluorescence, or transmission properties. The coating composition materials can be experimentally characterized for their UVC properties at a specific band of light within UVC for the application. For example, in a UVGI application the specific band can be around 254 nm.

Additives

The UVC reflective coating can include a wide variety of additives, which can be added in small amounts, but provide a measurable effect on the coating. Some examples can include additives to modify surface tension, improve flow properties, improve the finished appearance, increase wet edge, improve pigment stability, impart antifreeze properties, control foaming, control skinning, or the like. Other types of additives can include catalysts, thickeners, stabilizers, emulsifiers, texturizers, adhesion promoters, UV stabilizers, flatteners (e.g., de-glossing agents), biocides to fight bacterial growth, and the like.

Additionally, the coating can include filler, such as granular solids incorporated to impart toughness, texture, give the coating desired properties, or to reduce the cost of the coating. Fillers can include a type of pigment that serves to thicken the film, support its structure and increase the volume of the coating. Fillers are usually relatively inexpensive and inert materials, such as diatomaceous earth, talc, lime, barytes, clay, or the like.

Coating

The UVC reflective coating of the present disclosure can be below CPVC. That is, the UVC reflective coating can include a non-void coating. Previous approaches to UVC reflective coatings can include non-metal and metal approaches. Non-metal approaches can achieve UVC reflection through light-scattering air voids, such as void coatings. Coatings relying on void scattering can use high loadings of pigments, such as chalk (e.g., calcium carbonate), gypsum (e.g., kalsomine), barium sulfate and other low refractive index materials. At high loadings (e.g., greater than CPVC) of otherwise transparent extender pigments, air voids can form in the coating as it dries due to poor binder wetting of the pigment particles and the packed nature of those particles. The refractive index difference between air and the pigment, or the air and the binder, can create the light scattering needed for opacity and reflection. Such void coatings with greater than CPVC compositions whose light scattering can be prone to staining, suffer from low gloss, become partially transparent when wet (due to water filling the air voids), have poor rub resistance and other poor performance properties. The present UVC reflective coating can include a non-void coating capable of mitigating or eliminating at least one of these performance issues of previous coatings.

The present UVC reflective coating can be human-visible transparent, translucent (e.g., semi-opaque), or fully opaque, depending upon the desired end-use or substrate the UVC reflective coating is to be applied to. For example, healthcare facilities can have a variety of wall surfaces including traditional drywall based or brick painted surfaces, as well as fabric, polymer or paper wall coverings, glass surfaces, wood and metal doors, or polymer, metal, or fibrous ceiling tiles and ceramic, carpeted, or wood or polymer floor material. In the case of a textured, colored, or fabric wall covering, the UVC reflective coating may be desired to be human-visible transparent to reduce the effect on the aesthetic appearance of the existing wall. The UVC reflective coating can be incorporated into the wall, ceiling, or floor material at the manufacturer, such as during or after the manufacturing of the wall, ceiling, or floor material.

In an example, the UVC reflective coating can be human-visible transparent, such as including high index of refraction UVC scattering particles (e.g., the inorganic material) with an average particle size between about 10 to about 180 nm in conjunction with UVC transparent binders and additives. In another example, the UVC reflective coating can have a degree of opacity, such as including a generally larger average particle size of UVC scattering particles (e.g., the inorganic material), such as from about 180 nm to about 1 micron or larger. In an example, the generally larger average particle size UVC scattering particles can be used in a coating with UVC transparent binders and additives.

The UVC reflective coating of the present disclosure can be water based, such as a latex emulsion. In an example, the UVC reflective coating can be solvent borne, such as an oil based coating. Coatings can be cross linked by mixing or with added heat or other energy source. Various coatings utilizing pigment-binder-additive building blocks can be formulated to be UVC reflective according to the present disclosure, such that the UVC reflective coatings can be suitable for applications such as UVGI.

In an example, the UVC reflective coating can reflect at least about 10% of incident UVC light. That is, the UVC reflective coating, such as applied to a surface, can reflect at least 10% of the UVC light photons that contact the UVC reflective coating. Further, in an example, the UVC reflective coating can reflect up to about 75%, about 80%, about 82%, about 85%, about 87% or about 90% or more of incident UVC light. The UVC reflective coating composition can be designed according to a designated application. For example, in a hospital room application, high levels of UVC reflection, such as about 50% or greater, can be desired to provide increased sterilization potential. In such an application, a specified inorganic material, amount (e.g., volume, weight) of the specified inorganic material, a specified polymer binder, amount (e.g., volume, weight) of the specified polymer binder, or amount or type of additive can be specified to provide the desired UVC reflectivity.

Enumerated Embodiments

Specific enumerated embodiments [1] to [27] provided below are for illustration purposes only, and do not otherwise limit the scope of the disclosed subject matter, as defined by the claims. These enumerated embodiments encompass all combinations, sub-combinations, and multiply referenced (e.g., multiply dependent) combinations described therein.

[1.] An ultraviolet light-C (UVC) reflective coating composition, including:
 a polymer binder of a first volume having a first refractive index; and
 an inorganic material of a second volume having a second refractive index at least 0.2 greater than the first refractive index, the second volume in ratio to the first volume such that the reflective coating is at or below critical pigment volume concentration (CPVC), wherein the reflective coating is configured to diffusely reflect at least 10% UVC.

[2.] The UVC reflective coating of embodiment 1, wherein the coating is substantially devoid of an inorganic binder.

[3.] The UVC reflective coating of anyone or all of the above embodiments, wherein the coating is substantially devoid of a non-polymer inorganic binder.

[4.] The UVC reflective coating of anyone or all of the above embodiments, wherein the coating is substantially devoid of titanium dioxide.

[5.] The UVC reflective coating of anyone or all of the above embodiments, wherein the coating is substantially devoid of include zinc.

[6.] The UVC reflective coating of anyone or all of the above embodiments, wherein the coating is substantially devoid of lead.

[7.] The UVC reflective coating of anyone or all of the above embodiments, wherein the inorganic material includes an average particle size less than a micron.

[8.] The UVC reflective coating of anyone or all of the above embodiments, wherein the inorganic material includes an average particle size is from about 200 nm to about 800 nm.

[9.] The UVC reflective coating of anyone or all of the above embodiments, wherein the inorganic material has a particle size of about 10 nanometers to about 500 nanometers.

[10.] The UVC reflective coating of anyone or all of the above embodiments, wherein the inorganic material has a particle size less than about 180 nanometers.

[11.] The UVC reflective coating of anyone or all of the above embodiments, wherein the inorganic material is a metal oxide.

[12.] The UVC reflective coating of anyone or all of the above embodiments, wherein the inorganic material is at least one of magnesium oxide, aluminum oxide, tantalum oxide, holmium oxide, hafnium oxide, calcium oxide, lanthanum oxide, germanium oxide, tellurium oxide, zirconium oxide, europium oxide, erbium oxide, neodymium oxide, samarium oxide, ytterbium oxide, gold oxide, and silver oxide.

[13.] The UVC reflective coating of anyone or all of the above embodiments, wherein the inorganic material at least one of a pure form, an oxide form, a nitride form or an oxynitride form, of at least one of the group consisting of magnesium, aluminum, tantalum, holmium, calcium, lanthanum, germanium, tellurium, zirconium, europium, erbium, neodymium, samarium, ytterbium, gold, and silver.

[14.] The UVC reflective coating of anyone or all of the above embodiments, wherein the inorganic material has a purity level of at least 99% UVC transparent crystals.

[15.] The UVC reflective coating of anyone or all of the above embodiments, wherein the inorganic material has a purity level of at least 99.9% UVC transparent crystals.

[16.] The UVC reflective coating of anyone or all of the above embodiments, further including a colorizing pigment.

[17.] The UVC reflective coating of anyone or all of the above embodiments, further including an additive configured to aid in suspending the inorganic material within the coating composition.

[18.] The UVC reflective coating of anyone or all of the above embodiments, wherein the polymer binder includes an aliphatic compound.

[19.] The UVC reflective coating of anyone or all of the above embodiments, wherein the polymer binder includes at least one monomer including a pendant group.

[20.] The UVC reflective coating of anyone or all of the above embodiments, wherein the polymer binder includes at least one monomer with a halogenated element.

[21.] The UVC reflective coating of anyone or all of the above embodiments, wherein the polymer binder includes at least one monomer with a non-chlorine halogenated element.

[22.] The UVC reflective coating of anyone or all of the above embodiments, wherein the polymer binder includes polyvinylidene fluoride.

[23.] The UVC reflective coating of anyone or all of the above embodiments, wherein the second refractive index is at least 0.5 greater than the first refractive index.

[24.] The UVC reflective coating of anyone or all of the above embodiments, wherein the UVC reflective coating is at least partially human vision transparent.

[25.] The UVC reflective coating of anyone or all of the above embodiments, wherein the UVC reflective coating is at least partially human vision opaque.

[26.] The UVC reflective coating of anyone or all of the above embodiments, wherein the UVC reflective coating is configured to reflect at least 40% UVC light at 254 nm wavelength.

[27.] The UVC reflective coating of anyone of all of the above embodiments, wherein the polymer binder is an organic binder.

EXAMPLES

Example 1

A coating containing a blend of polyvinylidiene fluoride and polymethyl methacrylate at a ratio of fifty-fifty, in an emulsion with 15% coalescing solvent by weight of binder solids, with 300 nm 99.9% pure hafnium oxide particles in a dispersion at 70% solids by weight with 3% nonionic surfactant, said dispersion added to the emulsion at 1 part dispersion to 2 parts emulsion.

Example 2

A coating containing a blend of polyvinylidiene fluoride and polymethyl methacrylate and polyethylene acetate at a ratio of 1 to 1 to 2, in an emulsion with 12% coalescing solvent by weight of binder solids, with 500 nm 99.9% pure hafnium oxide particles and 900 nm 99% pure aluminum oxide particles at a ratio of 1 to 2 in a dispersion at 70% solids by weight with 3% nonionic surfactant and 1% steric stabilizer, said dispersion added to the emulsion at 1 part dispersion to 3 parts emulsion.

Example 3

A coating containing a blend of poly(co-ethylene-co-vinyl acetate) and polydimethylsiloxane at a ratio of 1.5 to 1, in an emulsion with 9% coalescing solvent by weight of binder solids, with 1.2 micron 99.9% pure magnesium oxide particles and 500 nm 99% pure aluminum oxide particles at a ratio of 1 to 3 in a dispersion at 65% solids by weight with 3% nonionic surfactant and 1% steric stabilizer, said dispersion added to the emulsion at 1 part dispersion to 2.1 parts emulsion.

All publications, patents, and published patent applications disclosed herein are incorporated herein by reference in their entirety. While in the foregoing specification this invention (as defined by the issued claims) invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. An ultraviolet light-C (UVC) reflective coating composition, comprising:

a polymer binder of a first volume having a first refractive index; and an inorganic material of a second volume having a second refractive index at least 0.2 greater than the first refractive index, the second volume in ratio to the first volume such that the reflective coating is at or below critical pigment volume concentration (CPVC), wherein the reflective coating is configured to diffusely reflect at least 10% UVC, and wherein the inorganic material is at least partially transparent to light at UVC wavelengths.

2. The UVC reflective coating of claim 1, wherein the coating is substantially devoid of an inorganic binder.

3. The UVC reflective coating of claim 1, further comprising a colorizing pigment.

4. The UVC reflective coating of claim 1, further comprising an additive configured to aid in suspending the inorganic material within the coating composition.

5. The UVC reflective coating of claim 1, wherein the polymer binder includes at least one monomer with non-chlorine halogenated elements.

6. The UVC reflective coating of claim 1, wherein the polymer binder is aliphatic.

7. The UVC reflective coating of claim 1, wherein the inorganic material includes an average particle size less than 1.0 micron.

8. The UVC reflective coating of claim 1, wherein the inorganic material has a particle size of at least about 10 nanometers.

9. The UVC reflective coating of claim 1, wherein the inorganic material has a particle size of less than about 800 nanometers.

10. The UVC reflective coating of claim 1, wherein the inorganic material is a metal oxide.

11. The UVC reflective coating of claim 1, wherein the inorganic material is any of the group consisting of magnesium oxide, aluminum oxide, tantalum oxide, holmium oxide, hafnium oxide, calcium oxide, lanthanum oxide, germanium oxide, tellurium oxide, zirconium oxide, europium oxide, erbium oxide, neodymium oxide, samarium oxide, ytterbium oxide, gold oxide, and silver oxide.

12. The UVC reflective coating of claim 1, wherein the inorganic material is a pure form, an oxide form, a nitride form or an oxynitride form, of at least one of the group consisting of magnesium, aluminum, tantalum, titanium, holmium, hafnium, calcium, lanthanum, germanium, tellurium, zirconium, europium, erbium, neodymium, samarium, ytterbium, gold, and silver.

13. The UVC reflective coating of claim 1, wherein the inorganic material has a purity level of at least 99 wt % UVC transparent crystals.

14. The UVC reflective coating of claim 1, wherein the second refractive index is at least 0.5 greater than the first refractive index.

15. The UVC reflective coating of claim 1, wherein the UVC reflective coating is at least partially human-visible transparent.

16. The UVC reflective coating of claim 1, wherein the UVC reflective coating is at least partially human-visible opaque.

17. The UVC reflective coating of claim 1, wherein the UVC reflective coating is configured to reflect at least 40% UVC light at 254 nm wavelength.

18. The UVC reflective coating of claim 1, wherein the polymer binder is an organic binder.

19. The UVC reflective coating of claim 1, wherein the inorganic material is completely transparent to light at UVC wavelengths.

* * * * *